(12) United States Patent
Jiang et al.

(10) Patent No.: US 10,656,776 B2
(45) Date of Patent: May 19, 2020

(54) RELATED TASKS AND TASKLETS FOR SEARCH

(71) Applicant: Microsoft Technology Licensing, LLC, Redmond, WA (US)

(72) Inventors: Li Jiang, Bellevue, WA (US); Sandy Wong, Seattle, WA (US); William Ramsey, Redmond, WA (US); Peter Bailey, I, Kirkland, WA (US); Paul Reinholdtsen, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 148 days.

(21) Appl. No.: 15/915,691

(22) Filed: Mar. 8, 2018

(65) Prior Publication Data

US 2018/0203572 A1    Jul. 19, 2018

Related U.S. Application Data

(63) Continuation of application No. 14/257,583, filed on Apr. 21, 2014, now Pat. No. 9,916,058, which is a continuation of application No. 12/794,634, filed on Jun. 4, 2010, now Pat. No. 8,707,198.

(51) Int. Cl.
*G06F 3/14*      (2006.01)
*G06F 3/0481*    (2013.01)
*G06F 16/9535*   (2019.01)
*G06F 3/0484*    (2013.01)

(52) U.S. Cl.
CPC ......... *G06F 3/0481* (2013.01); *G06F 3/0484* (2013.01); *G06F 16/9535* (2019.01)

(58) Field of Classification Search
CPC ....................................................... G06F 3/14
USPC ................... 715/779; 718/100; 707/706, 711
See application file for complete search history.

(56) References Cited

U.S. PATENT DOCUMENTS

| | | | |
|---|---|---|---|
| 8,001,101 B2* | 8/2011 | Anderson | G06F 16/334 707/706 |
| 2007/0266384 A1* | 11/2007 | Labrou | G06F 8/00 718/100 |
| 2012/0303607 A1* | 11/2012 | Moricz | G06F 16/951 707/711 |

\* cited by examiner

*Primary Examiner* — Ruay Ho
(74) *Attorney, Agent, or Firm* — Shook, Hardy and Bacon, L.L.P.

(57) ABSTRACT

Systems and methods are provided for performing tasks and related tasks. While a user is performing a task, a group of related tasks is presented. When a new task is selected, a new group of related tasks is provided. This allows a user to perform a series of tasks without having to separately search for each task. As the user moves between tasks, task information items are passed between the tasks so that previously provided information can be preserved.

20 Claims, 9 Drawing Sheets

RELATED TASKS AND TASKLETS FOR SEARCH

CROSS-REFERENCE TO RELATED APPLICATIONS

This application is a continuation of U.S. application Ser. No. 14/257,583 filed on Apr. 21, 2014, titled "Related Tasks and Tasklets for Search," having an issue date of Mar. 13, 2018 as U.S. Pat. No. 9,916,058, the entirety of which is incorporated herein by reference. application Ser. No. 14/257,583 is a continuation of U.S. application Ser. No. 12/794,634, filed on Jun. 4, 2010, titled "Related Tasks and Tasklets for Search," which issued on Apr. 22, 2014 as U.S. Pat. No. 8,707,198, the entirety of which is incorporated herein by reference.

BACKGROUND

Search engines are used to locate a variety of types of information. In response to a search query, a list of links to relevant documents can be returned. While this is now a familiar format, in order to complete a complex activity, the user will typically have to submit multiple search queries. Additionally, the user may have to click through multiple links that are responsive to each query to find desired information or documents. This process has to be repeated until a user is able to complete the desired activity.

SUMMARY

In various embodiments, systems and methods are provided for performing tasklets and related tasklets. While a user is performing a tasklet, a group of related tasklets is presented. When a new tasklet is selected, a new group of related tasklets is provided. This allows a user to perform a series of tasklets without having to separately provide a search query to find each tasklet. User context and/or result-specific context can be passed between the tasklets as the user moves from one tasklet to another.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
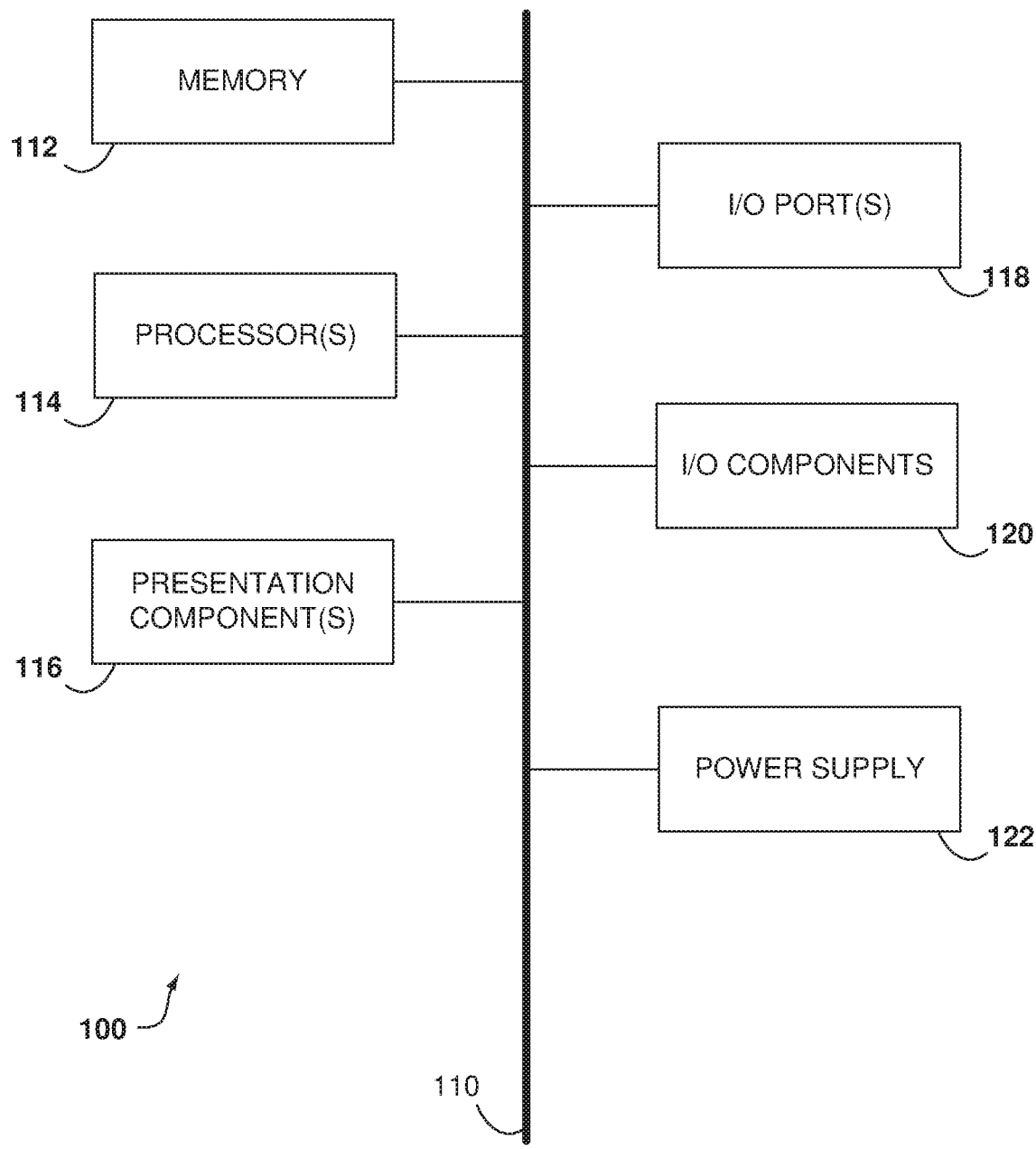
FIG. 1 is a block diagram of an exemplary computing environment suitable for use in implementing embodiments of the invention.

Conventional search engines return a list of links relevant to a single query. In a conventional search engine, there is no notion of previous queries, of previous input data, or of what future actions make sense. This can present difficulties when a user wishes to engage in a task that spans multiple queries. For example, consider a task such as planning a vacation. In order to accomplish this overall task, a user may need to perform a variety of actions, such as buying airplane tickets, obtaining a hotel room, and renting a car. For a conventional search engine, each of these activities requires a separate query. Thus, the task of planning the vacation spans these multiple queries. It would be desirable to have a system that attempts to understand the broader goal of the user when performing a task that can span multiple queries.

In the discussion below, a query refers to a single input for a search engine. A query can contain multiple query terms that are submitted to the search engine as a single input. A task refers to an activity that the user wants to perform or is performing. A tasklet refers to a portion of a task. For example, if the task is planning a vacation, a tasklet can be buying a plane ticket or reserving a hotel room. It is noted that some overlap can exist between a task and a tasklet. For example, obtaining a hotel room can include identifying potential hotel options near a given location that have available rooms, and then contacting one of the identified hotels to reserve the room. Both the identification of options and reserving the room at the hotel could be included in a tasklet. Alternatively, the identification of hotel rooms could be part of a separate tasklet from contacting a hotel and reserving the room. In the discussion below, links or selectors will be referred to. A selector for a tasklet allows a user to activate a tasklet for use by the user. A link is a type of selector that may be displayed to the user. In the discussion below, a reference to displaying a link to a user should be understood to generally refer to display of a selector.

In various embodiments, a system and method are provided for performing a series of tasklets. The system and method can allow a user to determine the combination of tasklets that corresponds to a user's desired task. A tasklet that a user is currently using is likely to be related to one or more other tasklets of interest to the user. The related tasklets can be determined, for example, based on information from the current user context, the current tasklet, and/or other contextual signals. This allows a smaller number of related tasklets to be identified from the larger number of all possible tasklets. A link or other selector for performing these related tasklets can be displayed along with the currently active tasklet. When a user desires to perform another tasklet, one of the related tasklets can be selected. This can result in display of the new selected tasklet, along with another group of selectors for related tasklets. This process can be repeated multiple times, allowing a user to perform multiple tasklets to achieve completion of an overall task without the need for a user to provide multiple search queries. Thus, when a user desires to perform a task, such as planning a vacation, individual tasklets of selecting a hotel, renting a car, and buying plane tickets can be performed as related tasklets without separately searching for each tasklet. These tasklets can be presented with a consistent user interface.

In order to provide this potentially continuous tasklet experience, a series of tasklets can be created. Tasklets are applications that can perform an activity associated with a task. For example, tasklets related to movies could include a tasklet for general information about a movie, a tasklet for movie reviews, a tasklet for identifying showtimes at a theater, and a tasklet for purchasing movie tickets.

To provide the various tasklets, a schema can be used to allow the tasklets to work together, such as by allowing information to be passed between tasklets. For example, the schema can provide a framework for passing context information, so that tasklets can be created independently, without knowledge of the other tasklets. Because information is passed within the consistent framework provided by the schema, the relationships between the tasklets can be determined after creation of the tasklet, as any two tasklets can pass information to each other using the schema. This can include allowing dynamic determination of tasklet relationships based on the current user context, the current tasklet, or other contextual information.

Part of the information passed into and out of tasklets using the schema can be information related to previously accessed tasklets. For example, the identity of the current tasklet and/or the general area of the current tasklet can be included as part of the context information. The identity of a tasklet can be valuable as context such as for interpreting ambiguous search queries. For example, a search query submitted by a user may return result entities corresponding to a movie, a book, and a video game. The next tasklet selected by a user may provide insight into which entity is desired by the user. Thus, the selection of a book related entity can cause the context of "book" to be added to the user context. Responsive results for future queries and/or future tasklet selection can then be based on this additional context. Another context item can be related to tasklets that have been completed by a user. When completion of a tasklet is detected, this can be stored as part of the context information. As the user continues to use tasklets, the tasklet display can optionally be modified to exclude completed tasklets from display. Alternatively, completed tasklets can still be made available, but can be included in a separate portion of the display to indicate the completed status.

Tasklets and Context

In various embodiments, tasklets are applications or other interfaces that allow a user to complete an activity. A tasklet can be a front end or other containment layer for an existing network application or web site. Alternatively, a tasklet can be a separate, original application, or a combination of an original application and a front end for an existing web site. An example of a tasklet could be an application that aggregates movie theater show time information, so that a user can select a desired movie. Another tasklet example could be mortgage payment calculator, so that a user considering a house could determine the monthly payment based on the house price. More complicated tasklets could aggregate airfare information, to allow a user to select and purchase a flight, or separate tasklets could be provided to review potential flights and then separately purchase a desired flight. The scope of a tasklet can be as narrow or as broad as desired by a tasklet creator.

When a tasklet is accessed by a user, a context can be provided for use by the tasklet. This can be referred to as associating the context with the tasklet, and the resulting display of the tasklet can be based on the associated context. A context can be any data field or other information that can be captured and used in a tasklet. One type of context can be a user context. This can refer to information provided by the user. Information provided by the user can include default information in a user's profile, or information explicitly provided by a user during a tasklet session. Still another source of user context information can be information obtained by parsing a search query. Examples of user context information can include a current location, a destination location, one or more other locations, one or more times and/or dates. Other types of information could include personal information entered by a user, such as an age or number of people participating in an activity. Still another type of context can include items that have been purchased.

Another type of context can be a result-specific context. Some tasklets accessed by a user can include result entities. Typically, result entities will correspond to result options within a tasklet that also match at least a portion of the user context. For example, a user can submit a search query related to a movie that is currently playing in theaters, such as "My Favorite Movie". In this example, the user context initially includes a city, zip code, or other location information. This user context can be supplemented with the context of the movie "My Favorite Movie" that is determined based on the search query. In this example, a tasklet interface displaying one or more result entities can be directly returned in response to the search query. The one or more result entities can correspond to movie theaters showing "My Favorite Movie" that also match the location specified by the user context.

In this example, one or more selectors can be provided that correspond to the result-specific entities. The one or more selectors can allow the user to access tasklets that will be activated using both the user context and context associated with the result-specific entity. For example, for each of the various local theaters listed, links or other selectors can be provided for a tasklet to show a map of the theater location, a tasklet providing a listing of the showtimes for the desired movie at that location, and/or a tasklet to purchase tickets at that location. When a user selects one of these tasklets, the result-specific context for the corresponding result entity can be associated with the selected tasklet. Thus, if a showtimes tasklet is selected, the result-specific context of the desired movie and the desired theater can be passed into the showtimes tasklet. The user would not be required to enter this information again and/or scan through multiple movie listings to find the desired movie. A tasklet displayed in connection with a result entity can be referred to as second layer tasklet.

In this example, the displayed tasklet interface can also include links or other selectors to other generally related tasklets. Some selectors for related tasklets could be for general movie information, such as reviews of the movie requested in the search query. Other tasklets could be generally related to the subject of movies or entertainment, such as tasklets for event information, restaurants, or sporting facilities. When a user selects one of these related tasklets, the current user context can be associated with the selected tasklet. For example, the city or zip code specified when looking for movie information can be passed on to a related tasklet for finding a restaurant. The identity of the previous tasklet as a movie-related tasklet can also be passed along. However, selection of these related tasklets does not necessarily result in any additional result-specific context being used to activate the tasklet. Thus, some selectors can correspond to related tasklets which are activated using the current user context, while other selectors can correspond to second layer tasklets that will incorporate result-specific context. Optionally, incorporating the result-specific context can be performed by modifying the user context to include the result-specific context. Alternatively, the user context and result-specific context can be maintained separately.

As another example, a search query that requests flights from Los Angeles to New York can return a variety of result types. Some results can be conventional links to web sites as responsive items, while another type of result can be a selector for a tasklet for flight information. In this example, the user select the tasklet related link or other selector in order to gain access to tasklets and the tasklet interface. If the user selects the link for the tasklet, the tasklet can be associated with the context of the origination and destination locations specified in the search query. This can allow the tasklet to include flight options on various airlines from Los Angeles to New York as result entities. For result entities displayed within the tasklet, such as individual flight options, each result entity can potentially include additional result-specific context. This additional context can correspond to the departure or arrival time of the specific flight, the airline providing the flight, or any other information related to the result.

Context information can be provided to a tasklet in any convenient manner. The method of passing context can depend on the schema used to implement the tasklets. For example, the tasklet can receive the entire available context, and then only use the portion of the context that is relevant to the tasklet. Alternatively, the context can be stored or located in a table or data server. The tasklet could then send a request to the table or data server for desired portions of the context. Still another option can be for the tasklet to expose a programming interface indicating desired context information, with another application or programming interface providing the context. Similarly, context information acquired and/or modified within a tasklet can be provided out in the same manner. For example, during user interaction with a tasklet, a user action can be received. This user action can modify a portion of the context and/or define a new information item within the context.

Figures 9A, 9B:
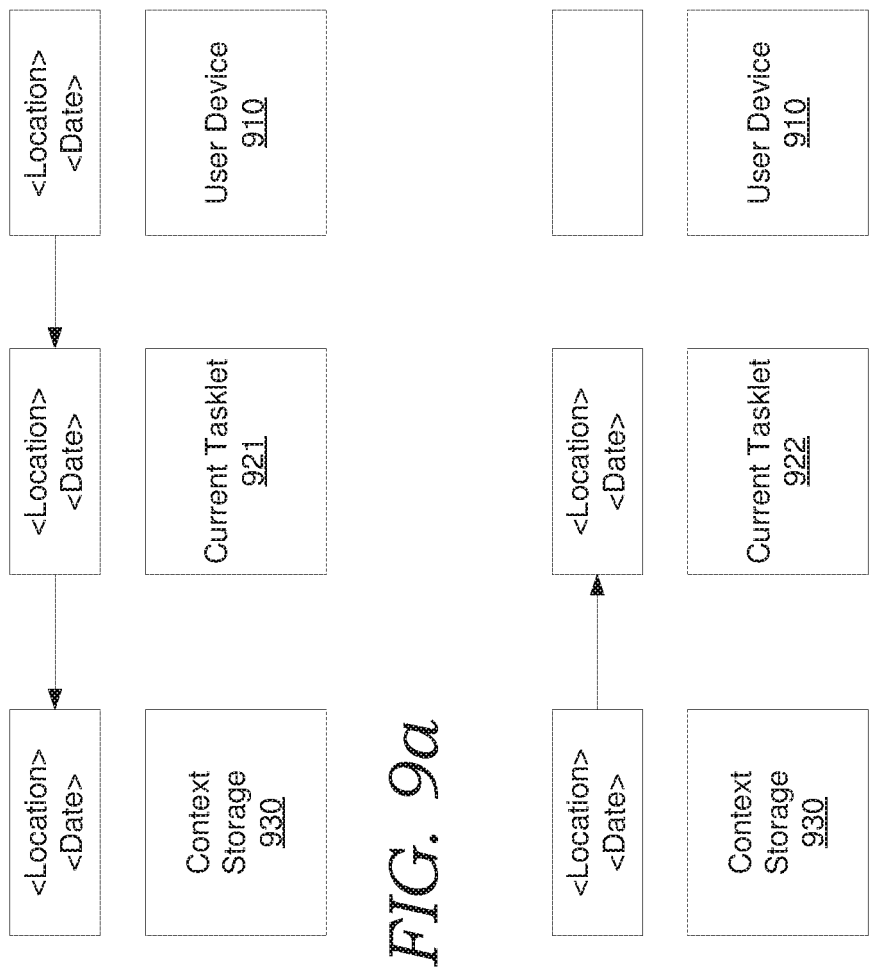
FIGS. 9a and 9b schematically show passing of context information according to an embodiment of the invention.

FIG. 9 schematically shows an example of having context information stored at a central location. In FIG. 9a, a user device 910 is shown interacting with a tasklet 921. The passage of context information is indicated above each element shown. In the example shown in FIG. 9a, a user has provided context information via user device 910. FIG. 9a shows that context information is been passed into tasklet 921 from user device 910. This context information is then passed to storage device 930. After the context information is passed into storage device 930, the context information can be available for use in additional tasklets. FIG. 9b shows the situation after selection of a different tasklet by the user. In FIG. 9b, the context information is passed from storage device 930 to the new tasklet selected by the user 922.

One method for determining context can be to extract context information from a search query. For example, a query of "vacation in New York in August" includes both a location (New York) and a time (August). Any convenient query parsing technique, such as a semantic model, can be used to extract fields from a query. The extracted fields can then be incorporated into a user context.

If one or more desired pieces of information correspond to undefined data in a user context, the tasklet can acquire the desired information by any convenient method. For example, the tasklet can have data fields that can either be pre-populated with desired items, or that can be manually filled by a user. Alternatively, the tasklet can separately prompt the user for desired portions of the context.

Tasklet Selection and Determining Related Tasklets

A tasklet can initially be selected by any convenient method. One option can be for a user to submit a search query to a search engine. In addition to and/or in place of a responsive network document, one or more tasklets can be provided to the user as responsive to the query. Tasklets can be identified as responsive by any suitable method. Tasklets can be correlated to keywords, or tasks can be analyzed and ranked like other network documents. The tasks can be displayed for selection by representing the task with a selector. The selector can be simply a link to a tasklet, or the selector can be accompanied by a further description of the function(s) of the tasklet.

After selection of an initial tasklet, the tasklet can be displayed. The user can then interact with the tasklet or otherwise perform the activity offered by the tasklet. In addition to the selected tasklet, selectors can be displayed for one or more related tasklets. The selectors can be displayed in any convenient manner. For example, a separate portion of an interface can be included that displays the selectors while the user is performing the current tasklet.

Related tasklets can be identified or determined in a variety of manners. One option for determining related tasklets can be to have correlation chart, bubble diagram, or some other type of graph or table that indicates the relationship between tasks. Tasks that are sufficiently related based on the diagram or table can be displayed as related tasks. In other embodiments, numerical scores can be assigned to relationships, and any task with more than a threshold relationship value can be considered related.

While static relationships between tasklets can be used, in other embodiments the relationships between tasklets can be determined dynamically. One option can be to track user search activity over a large group of users. The types of sites visited in order by users can be tracked and analyzed, to determine patterns of usage. Tasklets corresponding to such detected patterns of usage can then be offered as related tasklets based on the current tasklet. Another type of information that could be used for predicting related tasklets can be to track user activity logs for co-currence of tasklets during a user tasklet session. Still another option can be to use the user context in conjunction with the data from activity logs. Yet another option could be to use the current user tasklet as a search query. Search query terms representing a tasklet can be stored as metadata for the tasklet. These search terms could be included as the title of the tasklet, as data not normally displayed to the user, or in any other convenient manner. The search terms can be selected, for example, so that submitting the search terms to a search engine result in displaying the tasklet as the highest ranked results, with the next highest ranking results corresponding to related tasklets. Based on one or more of these types of analysis, a group of related tasklets can be determined based on the tasklets with the highest relevance scores. Still other methods could be used, so long as the result is determining a group of related tasklets.

Yet another option for determining related tasklets can be to use ranking, such as rankings determined by a tasklet prediction model. A tasklet prediction model can incorporate a variety of information, possibly in a manner analogous to a search engine, to determine potential related tasklets. Alternatively, the tasklet prediction model can be used to select some tasklets, while other methods are used to select other tasklets. Still another option can be to a combination of techniques as weights in an overall prediction model. A tasklet prediction model can provide rankings for potential related tasklets as a function of, for example, a search query, a location, a time, a user state, a user history, a social network, or any other information that can be used for generation or refinement of search results.

After determining the group of related tasklets, one or more tasklets can optionally be excluded from the group. One reason for excluding a tasklet can be that the tasklet has already been completed by the user. For example, a tasklet for purchasing an airline ticket can be considered complete based on detecting that a user has completed a credit card transaction, or based on detection that a ticket locator code has been provided to the user, or by any other convenient method. When completion of a tasklet is detected, the completed tasklet can be excluded from any groups of related tasklets during the current tasklet session. The excluded tasklet can be replaced with the next most relevant related tasklet, or there can be one less related tasklet displayed to the user. Optionally, an access method can be provided for any excluded tasklets. A link can be provided to display the selectors for excluded tasklets, or selectors for the excluded tasklets can be displayed in another portion of the user interface. For example, a portion of the user interface could be provided that shows a listing of tasklets considered complete in the current tasklet session. Such a display could include a selector to allow those completed tasklets to be accessed again, either to modify previous activity or to engage in a new tasklet or transaction. Another option can be to provide a method for a user to designate a tasklet as not complete, so that the tasklet will appear in the related tasklets group.

Figure 8:
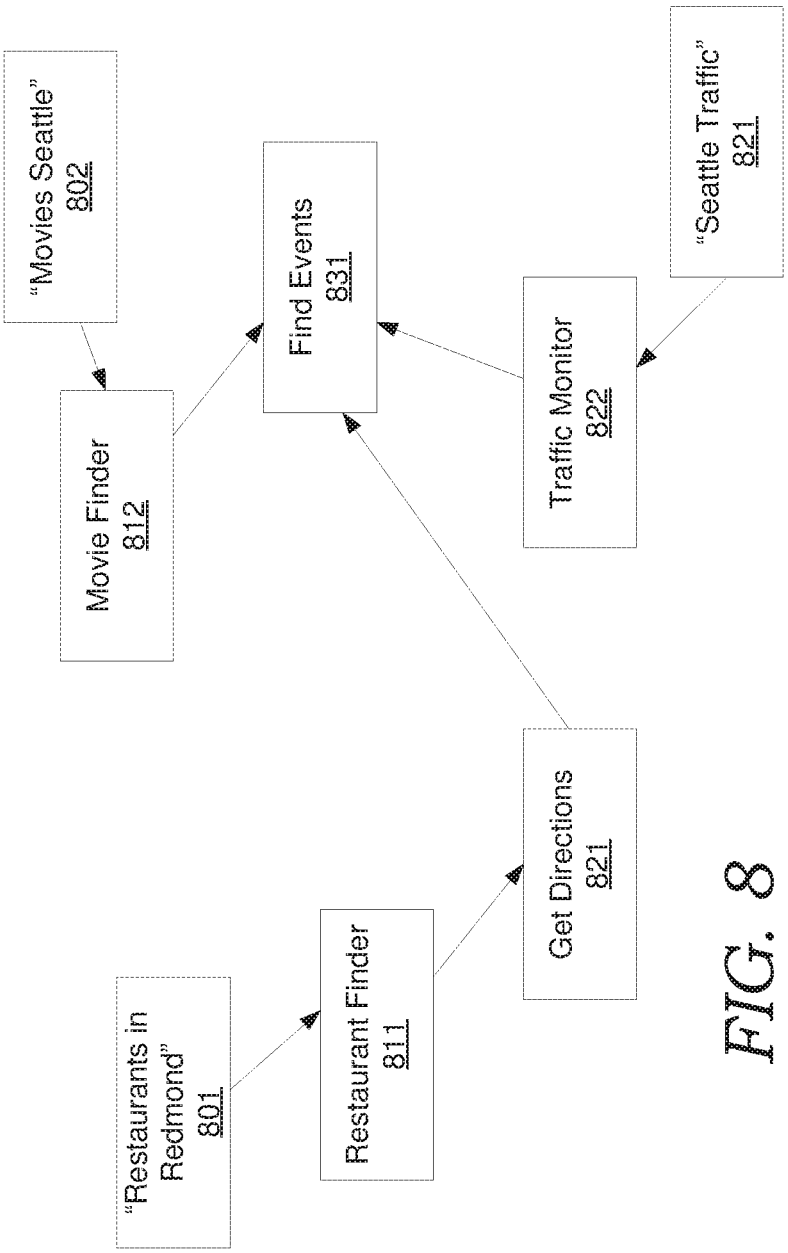
FIG. 8 depicts a sample diagram of task relationships.

In order to further exemplify tasklet relationships, FIG. 8 shows an example of a potential relationship diagram for tasklets. In FIG. 8, three different starting search queries 801-803 are shown. In the example shown in FIG. 8, the tasklets 811-813 correspond to the highest ranked tasklets that are responsive to the search query. Based on selection of tasklets 811-813 in response to queries 801-803, respectively, users would be able to use selectors for related tasklets to access tasklets 821, 822, and 831. Note that each of the three initial search queries can allow a user to find the Event Finder tasklet 831, without the event finder tasklet 831 necessarily being associated with either the initial search query, or the first task selected by the user in response to a search query.

FIG. 8 shows examples of potential relationships between tasklets. Such relationships could be used to display tasklets as related tasklets, or as second layer tasklets that correspond to a result entity within a tasklet. Additional tasklet relationships could also exist in FIG. 8. For example, Traffic Monitor 822 could be a related tasklet for Get Directions 821. Similarly, Movie Finder 812 could be a related tasklet for Restaurant Finder 811. Note that tasklet relationships can be either one way or two way relationships, and/or the relationships can have varying weights depending on the direction of relation. For example, Traffic Monitor 822 could appear as a related tasklet when Get Directions 821 is active, but Get Directions 821 might not be displayed as a related tasklet when Traffic Monitor 822 is active.

Based on the above, it can be seen that in some embodiments, once a user selects a tasklet, the user can perform an indefinite number of additional tasklets by continuing to access new activities via the related tasklets.

Tasklet Presentation Interface

As part of the tasklet experience, a user interface can be provided for presenting tasklets to a user. The user interface can contain any number of sections or areas. In some embodiments, the user interface can maintain a consistent appearance as a user moves from tasklet to tasklet. For example, the user interface can provide one section for allowing the user to interact with a current tasklet. A second section can provide related tasklets. Still another section can provide one or more interfaces for searching for and/or refining a search for tasklets, such as a section for context information or a query box. As a user moves between tasklets, the portions of the interface can remain the same. This can provide the user with a consistent tasklet experience as the various tasklets are performed.

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasklets or implement particular abstract data types. The invention may be practiced in a variety of system configurations, including hand-held devices, consumer electronics, general-purpose computers, more specialty computing devices, and the like. The invention may also be practiced in distributed computing environments where tasklets are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100. In an embodiment, the computer-readable media can be tangible computer-readable media. In another embodiment, the computer-readable media can be non-transitory computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
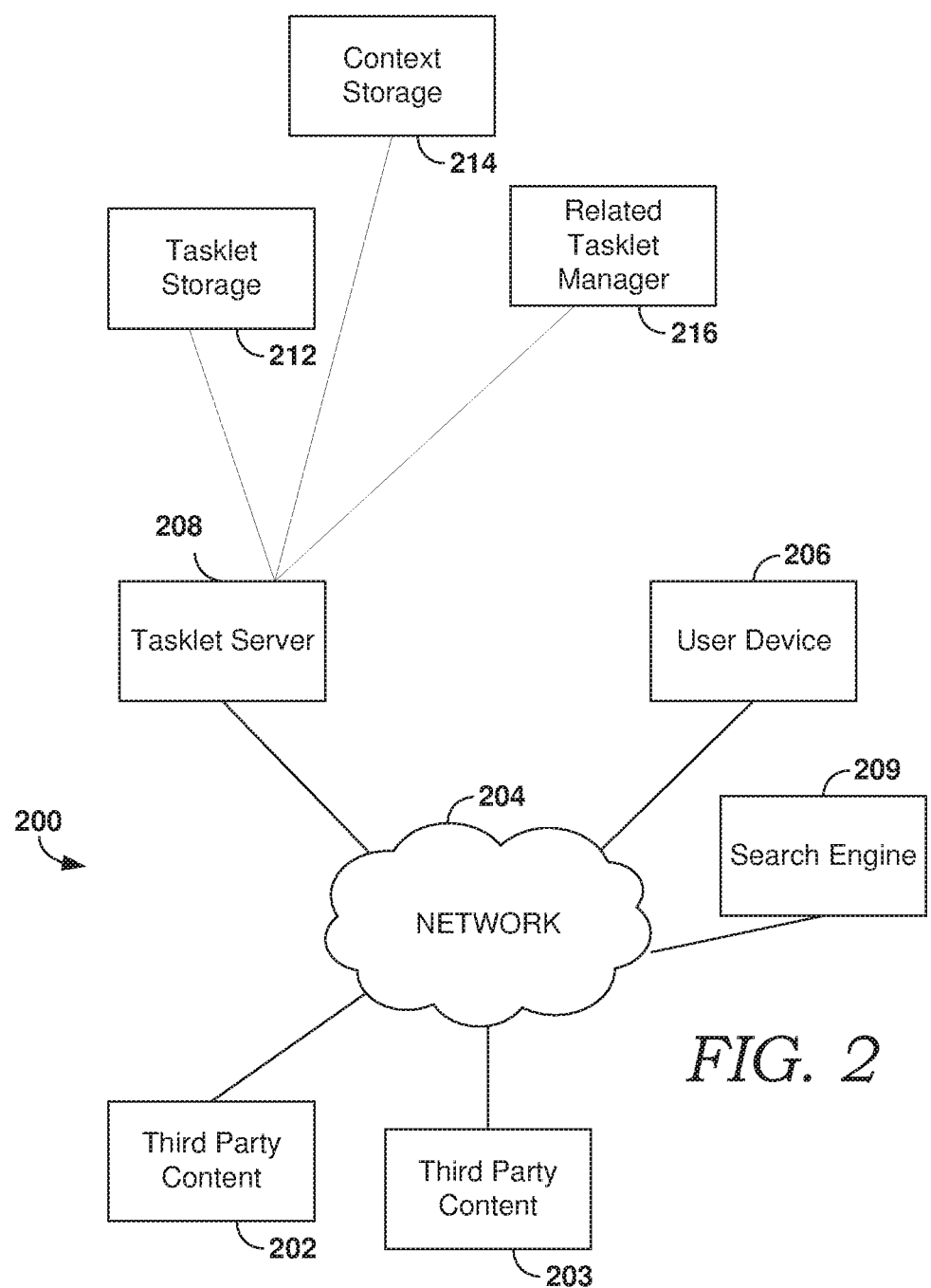
FIG. 2 schematically shows a network environment suitable for use in embodiments of the invention.

Turning now to FIG. 2, a block diagram is illustrated, in accordance with an embodiment of the present invention, showing an exemplary computing system 200. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes a user device 206 and a tasklet server 208 in communication with one another via a network 204. The tasklet server 208 can also communicate with a search engine 209 via network 204. Third party content 202 and 203 can represent content made accessible via a tasklet provided by tasklet server 208. The tasklet server 208 can include a tasklet storage component 212, context storage 214, and a related tasklet manager 216. Alternatively, tasklet storage component 212, context storage 214, and related tasklet manager 216 can all be connected to each other via a network. Tasklet server 208 can provide tasklets and a tasklet interface to a user device 206. Tasklet storage component 212 can store the various available tasklets. Context storage 214 can track the information generated during a tasklet session, so that it is passed between tasklets. Related tasklet manager 216 can determine related tasklets, including tracking tasklets that have previously been completed. In other embodiments, the various activities related to managing tasklets can be organized with different divisions between activities.

Figure 3:
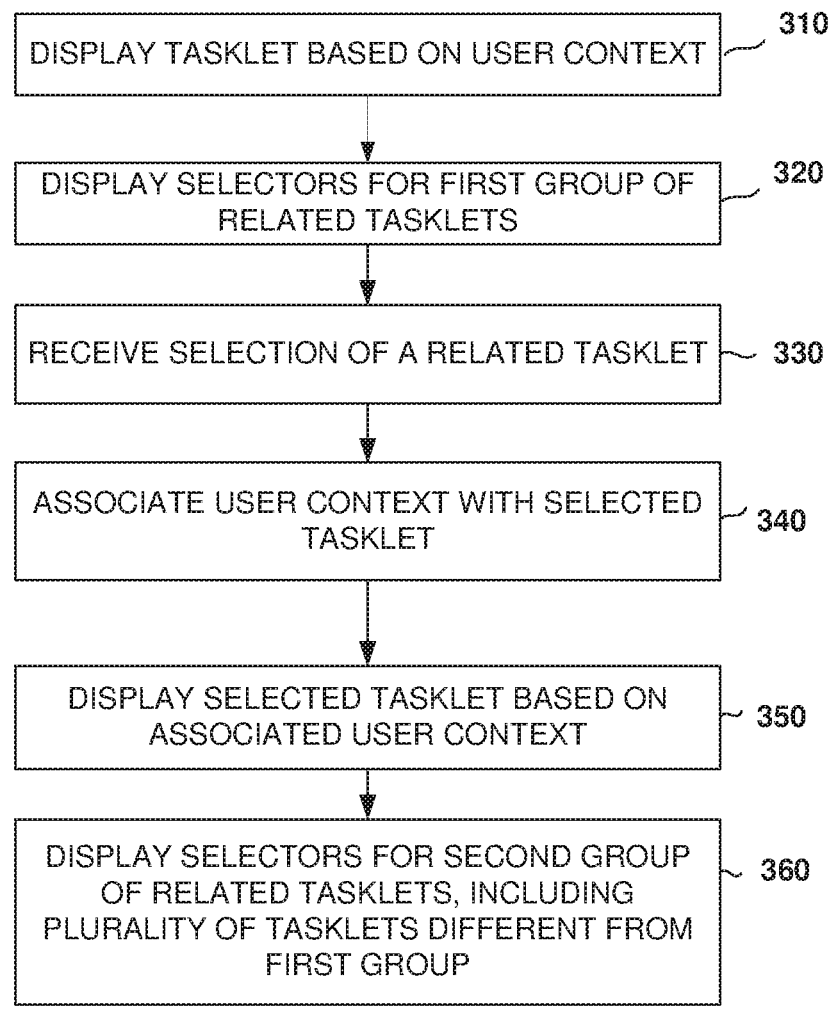
FIG. 3 depicts a flow diagram of a method according to an embodiment of the invention.

FIG. 3 depicts a flow chart showing a method according to an embodiment of the invention. In the embodiment shown in FIG. 3, a tasklet is displayed 310 based on a user context. This tasklet can be an initial tasklet, such as a tasklet that was responsive to a search query. Alternatively, the tasklet can represent a tasklet from some intermediate point in a tasklet session. Selectors (such as links) are also displayed 320 for a first group of related tasklets. The first group of related tasklets can be determined based on a stored set of tasklet relationships, or the related tasklets can be determined dynamically. A selection of a task from the first group of tasks is received 330. The user context is then associated 340 with the selected task. The selected task is displayed 350 based on the associated user context. Selectors for a second group of tasks can be displayed 360. The second group of tasks can be tasks related to the selected task.

Figure 4:
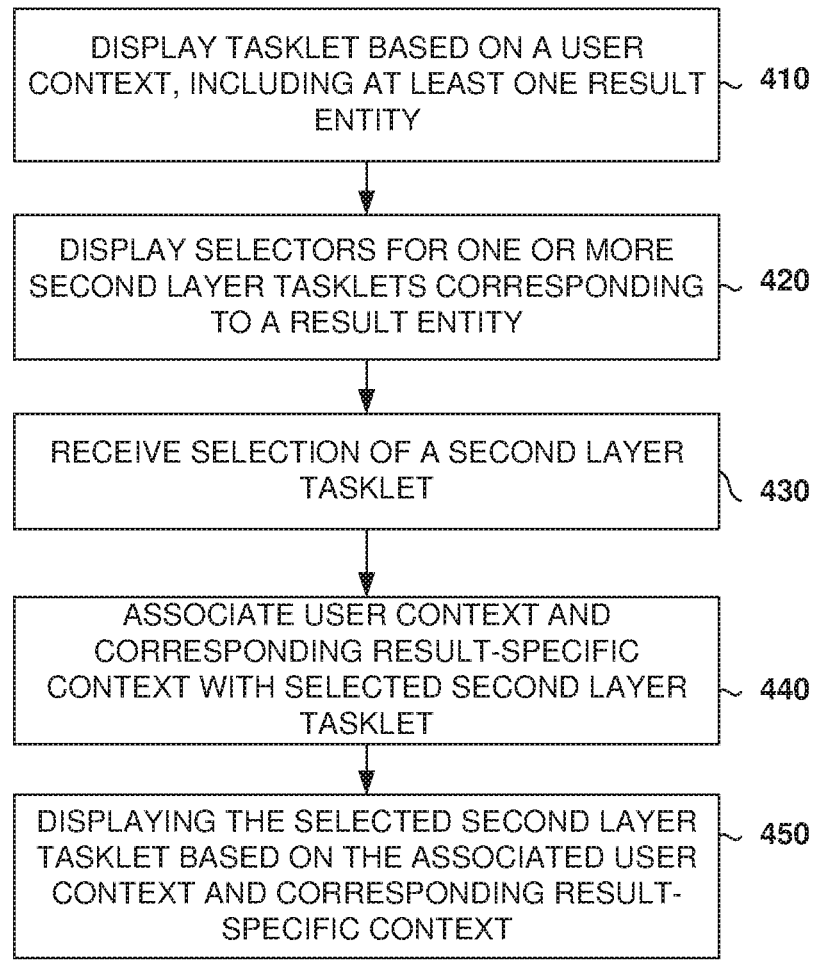
FIG. 4 depicts a flow diagram of a method according to an embodiment of the invention.

FIG. 4 depicts a flow chart showing a method according to another embodiment of the invention. In the embodiment shown in FIG. 4, a tasklet is displayed 410 based on a user context. The tasklet includes at least one result entity. Selectors are displayed 420 for one or more second layer tasklets corresponding to a result entity. The selectors can all correspond to the same result entity, or the selectors can be associated with different result entities. Optionally, selectors for the same tasklets can be displayed as corresponding to each result entity. In such an embodiment, the difference in selection of a second layer tasklet is based on the result-specific context of each result entity. A selection is received 430 for a second layer tasklet. The user context and the corresponding result-specific context are associated 440 with the selected second layer tasklet. The selected second layer tasklet is displayed 550 based on the associated user context and the corresponding result-specific context.

Figure 5:
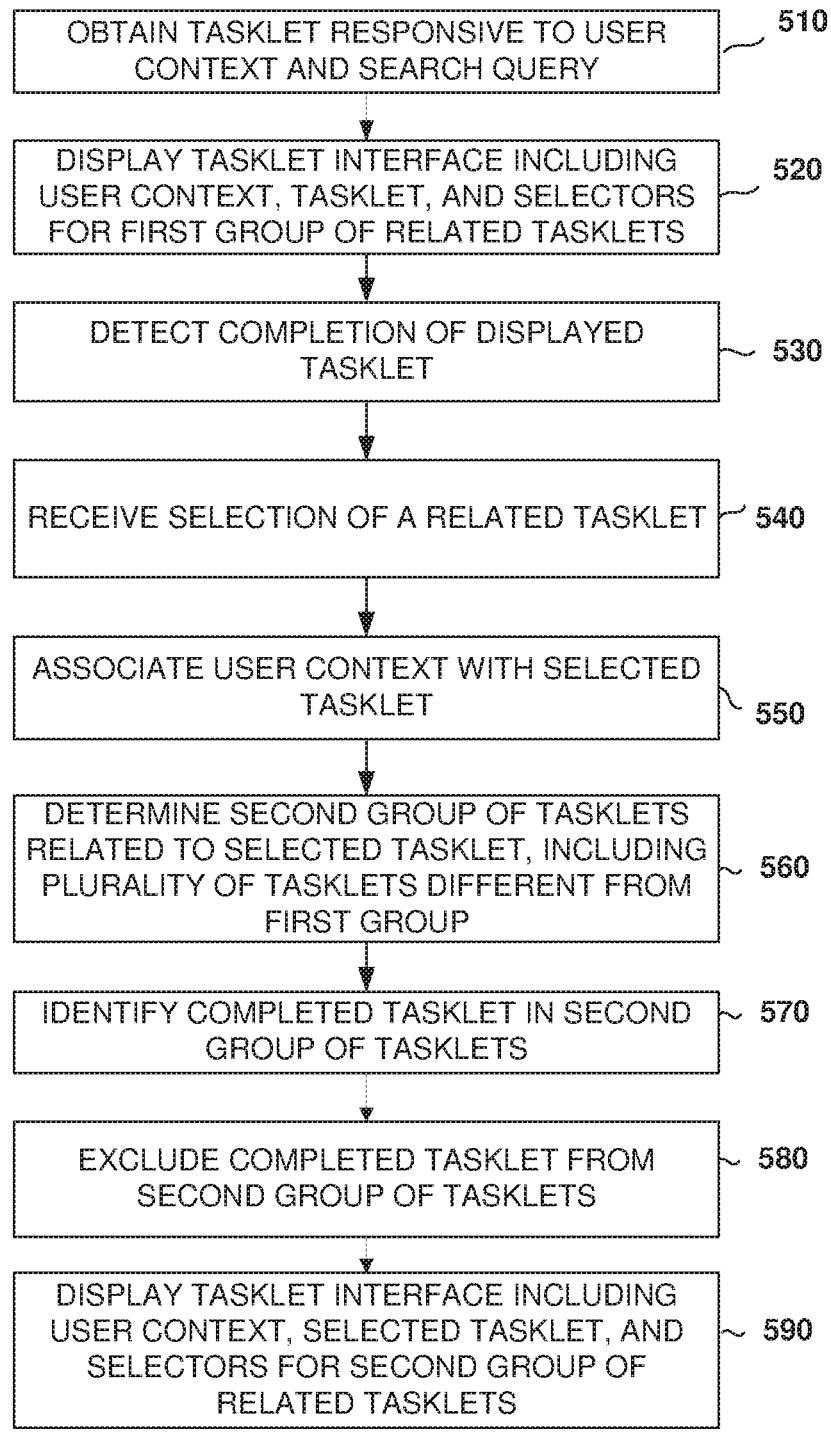
FIG. 5 depicts a flow diagram of a method according to an embodiment of the invention.

FIG. 5 depicts a flow chart showing a method according to yet another embodiment of the invention. In the embodiment shown in FIG. 5, a tasklet is obtained 510 that is responsive to a user context and a search query. The tasklet can be obtained by performing a search using a search query provided by a user, or the search query can be generated automatically based on other user actions. A tasklet interface is displayed 520. The display of the tasklet interface includes display of a user context, the obtained tasklet, and selectors for a first group of tasklets related to the obtained tasklet. Completion of the obtained tasklet is detected 530. Detection that a tasklet is completed can be by any convenient method. For example, completion of a tasklet can be defined based on a user performing a specified action within the tasklet. A selection of a related tasklet is then received 540. The user context is associated 550 with the selected tasklet. A second group of tasklets is determined 560 that are related to the selected tasklet. The second group of related tasklets includes a plurality of tasklets that are different from the first group of tasklets. The completed tasklet is identified 570 in the second group of tasklets. The completed tasklet is excluded 580 from the second group of tasklets. The tasklet interface is then displayed 590, including display of the user context, the selected tasklet, and selectors for the second group of related tasklets.

Figure 6:
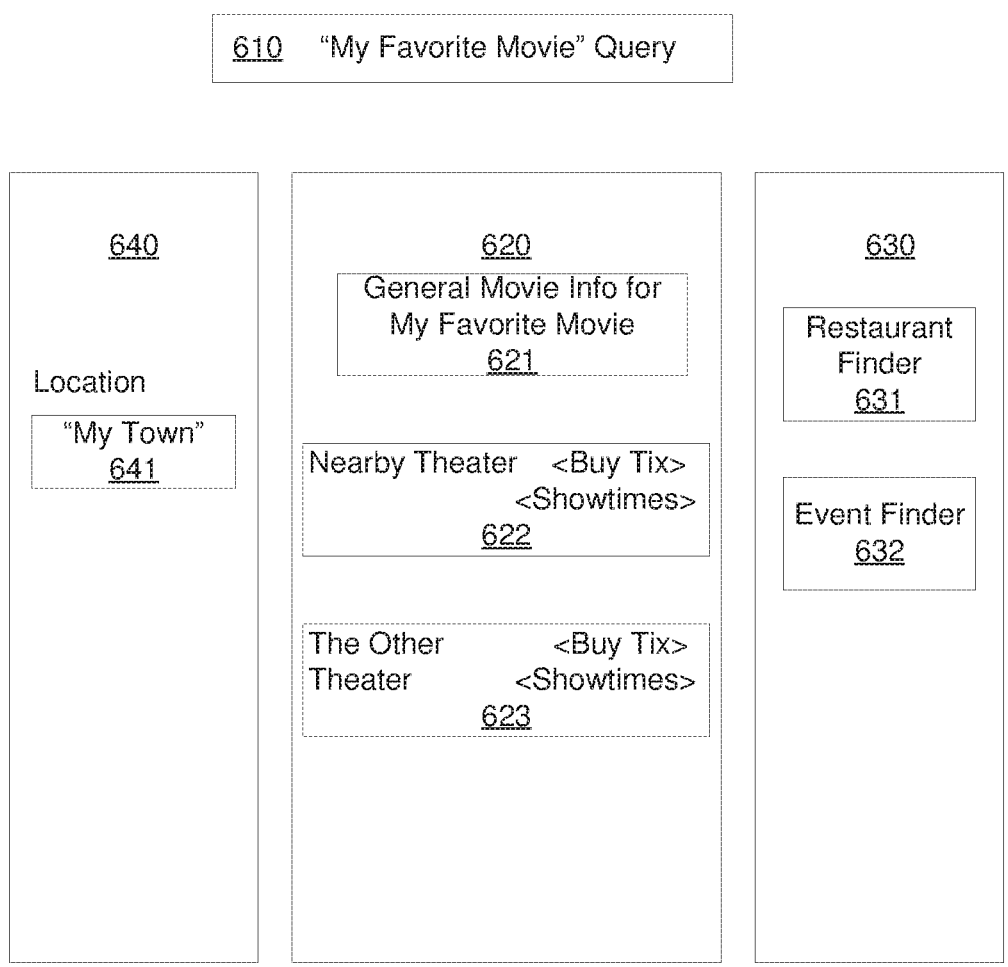
FIG. 6 schematically shows an example of a task interface according to an embodiment of the invention.

FIG. 6 shows an example of a display of a tasklet interface. In FIG. 6, a search query box 610 is provided. In FIG. 6, the search query box shows the last query entered by the user, which was a query for the movie titled "My Favorite Movie". User context information is shown in area 640. Currently, the only user context information is the location 641 of the user, which is set to "My Town". General movie information tasklet 621, shown in tasklet display area

620, was one of the items returned as being responsive to the "My Favorite Movie" query. Selection of tasklet 621 resulted in display of the tasklet interface. Based on the context 640, general movie information tasklet 621 includes two result entities 622 and 623 for nearby theaters playing the movie. Result entities 622 and 623 both include selectors for selection of second layer tasklets. In the embodiment shown in FIG. 6, the second layer tasklets for both result entities are the same, allowing the user to select "Buy Tix" or "Showtimes". Note that result entity 622 has a result-specific context corresponding to "Nearby Theater", including the identity of Nearby Theater, the location of Nearby Theater, and optionally any other context information that is specified. This result-specific context is different than the result-specific context for "The Other Theater", as the name, location, and other information corresponding to The Other Theater is different. Area 630 provides related tasklet selectors for other activities that may be of interest, such as restaurant finder 631 and event finder 632.

Figure 7:
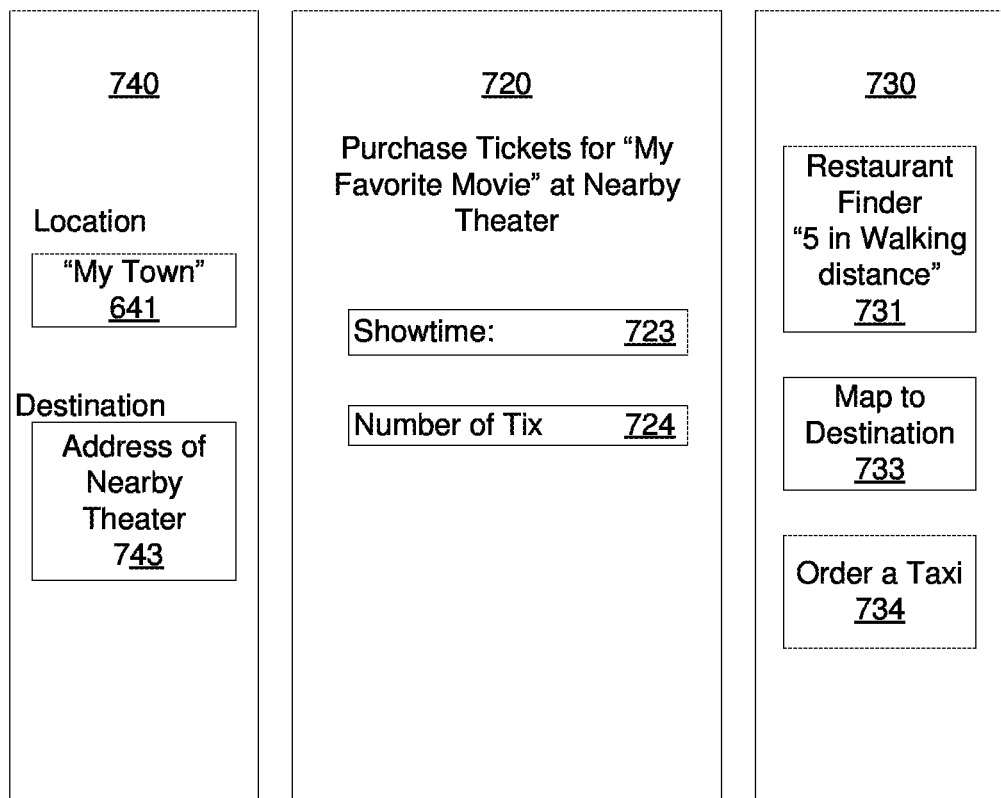
FIG. 7 schematically shows an example of a task interface according to an embodiment of the invention.

In this example, the user selects the "Buy Tix" second layer tasklet corresponding to Nearby Theater result 622. This takes the user to the Buy Tix tasklet. An example of how the task interface could change is shown in FIG. 7. Because the Buy Tix tasklet was displayed as a second layer tasklet, additional result-specific context was available. In FIG. 7, this additional context was the identity of the theater and the address of the theater. Both of these items of result-specific context were associated with the tasklet during activation, so that the user would not have to specify again which theater to buy tickets for. Additionally, the user context 740 was modified to include the address of the theater as a destination location 743. The user's current location 641 remained unchanged. Note that the result-specific context used for activation of the "Buy Tix" selector is different from the result-specific context that would have been used if the "Buy Tix" selector corresponding to "The Other Theater" had been selected. Tasklet area 720 now displays the tasklet for purchasing tickets for the movie, including interfaces 723 and 724 for selecting a showtime and a number of tickets. The interfaces 723 and 724 can be drop down menus, data entry boxes, or any other convenient interface. Related tasklet area 730 has also changed. A selector to the Restaurant Finder tasklet 731 is still displayed, but it now includes preview information based on the movie theater as a destination location. The preview informs the user that 5 restaurants are within walking distance of the theater. Additionally, new tasklets Map to Destination 733 and Order a Taxi 734 are displayed. If Map to Destination 733 or Order a Taxi 734 is selected, the user context information of Location 641 and Destination 743 will be passed to the selected tasklet. In the embodiment shown in FIG. 7, the related tasklet for the event finder has temporarily been removed as it is not as high in relevance for someone in the process of purchasing tickets. However, in other embodiments the event finder could still be visible, as well as other activities.

Additional Embodiments

In an embodiment, one or more computer-storage media storing computer-useable instructions that, when executed by a computing device, perform a method for performing a series of tasks are provided. The method includes displaying a tasklet based on a user context. Selectors are displayed for a first group of tasklets related to the displayed tasklet. A selection of a related tasklet is received. The user context is associated with the selected tasklet. The selected tasklet is then displayed based on the associated user context. Selectors are also displayed for a second group of tasklets related to the selected tasklet, the second group of tasklets including a plurality of tasklets that differ from the first group of tasklets.

In another embodiment, a method for performing a series of tasks is provided. The method includes displaying a tasklet based on a user context, the tasklet including at least one result entity. Selectors are displayed for one or more second layer tasklets, each second layer tasklet corresponding to a result entity having a result-specific context. A selection of a second layer tasklet is received. The user context and the corresponding result-specific context are associated with the selected second layer tasklet. The selected second layer tasklet is displayed based on the associated user context and the result-specific context.

In still another embodiment, one or more computer-storage media storing computer-useable instructions that, when executed by a computing device, perform a method for performing a series of tasks are provided. The method includes obtaining a tasklet responsive to a user context and a search query. A tasklet interface having a format is displayed, the display of the task interface including display of a user context, a tasklet, and one or more selectors for a first group of tasklets related to the obtained tasklet. Completion of the displayed tasklet is detected. A selection of a tasklet from the first group of tasklets is received. The user context is associated with the selected tasklet. A second group of tasklets is determined that are related to the selected tasklet, the second group of tasklets including a plurality of tasks that differ from the first group of tasks. The completed tasklet is identified in the second group of tasklets. The completed tasklet is then excluded from the second group of tasklets. The tasklet interface having the format is displayed, the tasklet interface including the selected tasklet from the first group of tasks, the user context, and one or more selectors for the second group of tasklets.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

What is claimed is:

1. One or more computer-storage devices storing computer-useable instructions that, when executed by a computing device, perform a method comprising:
   determining result entities associated with a user context;
   providing one or more tasklets associated with the result entities, each tasklet being an application that can perform an activity associated with a task;
   based on a first selection of a tasklet of the one or more tasklets, providing one or more selectors for one or more second layer tasklets based on a context associated with a result entity of the result entities being associated with the selected tasklet; and
   based on a second selection of a second layer tasklet of the one or more second layer tasklets, providing the selected second layer tasklet in accordance with the user context and the context associated with the result entity.

2. The devices of claim 1, wherein providing the one or more tasklets based on the user context comprises providing the one or more tasklets responsive to a search query.

3. The devices of claim 1, wherein the result specific context for each result entity is different.

4. The devices of claim 1, further comprising modifying the user context to incorporate the at least a portion of the context associated with the result entity after receiving the second selection of the second layer tasklet.

5. The devices of claim 1 further comprising causing display of the one or more tasklets.

6. The devices of claim 1 further comprising causing display of the one or more selectors.

7. The devices of claim 1 further comprising causing display of the selected second layer tasklet.

8. The devices of claim 1, wherein the user context comprises a search query.

9. A method comprising:
determining result entities associated with a user context;
providing one or more tasklets associated with the result entities, each tasklet being capable of performing an activity associated with a task;
based on a first selection of a tasklet of the one or more tasklets, providing one or more selectors for one or more second layer tasklets based on a context associated with a result entity of the result entities being associated with the selected tasklet;
based on a second selection of a second layer tasklet of the one or more second layer tasklets, providing the selected second layer tasklet in accordance with the user context and the context associated with the result entity.

10. The method of claim 9, wherein providing the one or more tasklets comprises providing the one or more tasklets responsive to a search query.

11. The method of claim 9, wherein the context for each result entity is different.

12. The method of claim 9, wherein providing the one or more selectors for the one or more second layer tasklets further comprises providing preview information for the one or more second layer tasklets.

13. The method of claim 9 further comprising causing display of the selected second layer tasklet in accordance with the user context and the at least the context associated with the result entity.

14. The method of claim 9 further comprising causing display of the one or more tasklets.

15. The method of claim 9 further comprising causing display of the one or more selectors for the one or more second layer tasklets.

16. A method comprising:
determining result entities associated with a user query;
providing one or more tasklets associated with the result entities, each tasklet being capable of performing an activity associated with a task;
based on a first selection of a tasklet of the one or more tasklets, providing one or more selectors for one or more second layer tasklets based on a context associated with a result entity of the result entities being associated with the selected tasklet; and
based on a second selection of a second layer tasklet of the one or more second layer tasklets, providing the selected second layer tasklet in accordance with the user query and the context associated with the result entity.

17. The method of claim 16, wherein providing the selected second layer tasklet comprises displaying the selected second layer tasklet.

18. The method of claim 16, wherein the one or more tasklets are provided in response to the user query.

19. The method of claim 16, wherein providing the one or more selectors comprises displaying the one or more selectors.

20. The method of claim 16, wherein the context for each result entity is different.

* * * * *